(12) United States Patent
Lee et al.

(10) Patent No.: US 9,145,769 B2
(45) Date of Patent: Sep. 29, 2015

(54) UNDERGROUND MINING RIB SUPPORT SYSTEM AND METHOD

(76) Inventors: Michael Hall Lee, Stockdale, PA (US); Regis Thomas Satina, Bentleyville, PA (US)

(*) Notice: Subject to any disclaimer, the term of this patent is extended or adjusted under 35 U.S.C. 154(b) by 192 days.

(21) Appl. No.: 13/432,226

(22) Filed: Mar. 28, 2012

(65) Prior Publication Data

US 2013/0017022 A1    Jan. 17, 2013

Related U.S. Application Data

(60) Provisional application No. 61/506,268, filed on Jul. 11, 2011.

(51) Int. Cl.

| | |
|---|---|
| *E21D 11/00* | (2006.01) |
| *E21D 11/18* | (2006.01) |
| *B29C 39/00* | (2006.01) |
| *B29K 23/00* | (2006.01) |

(52) U.S. Cl.
CPC ............ *E21D 11/183* (2013.01); *B29C 39/003* (2013.01); *B29K 2023/065* (2013.01)

(58) Field of Classification Search
CPC ........................................................ E04B 1/28
USPC ................ 405/259.1, 272, 288, 302.1, 302.2; 299/11, 12
See application file for complete search history.

(56) References Cited

U.S. PATENT DOCUMENTS

| | | | | |
|---|---|---|---|---|
| 4,626,139 | A  * | 12/1986 | Blackwell ................... | 405/259.1 |
| 4,734,025 | A  * | 3/1988 | Kawamura et al. ............ | 425/145 |
| 6,855,440 | B2 * | 2/2005 | Bracegirdle .................. | 428/702 |
| 2007/0077122 | A1* | 4/2007 | Birchler et al. .................. | 405/46 |
| 2010/0207004 | A1* | 8/2010 | Hermans et al. .......... | 248/346.01 |

FOREIGN PATENT DOCUMENTS

| | | | |
|---|---|---|---|
| WO | WO 2010/022494 | * | 3/2010 |
| WO | WO 2011/006192 | * | 1/2011 |

* cited by examiner

*Primary Examiner* — Sean Andrish
(74) *Attorney, Agent, or Firm* — Stanzione & Associates, PLLC

(57) ABSTRACT

A rib support system, a rib support device, a rib support method, a method for manufacturing a rib support device, and a computer readable medium are provided as described herein. The rib support device is configured to support a mine or tunnel rib (or wall) or roof to prevent spalling, and to provide safety and long term protection of tunnel (or open) areas. The rib support device may be made from a high density polyethylene (HDPE) material, or the like, that is resistant to corrosion, has superior overall performance and strength, has few (or no) sharp edges, is light weight, and is easy to handle.

13 Claims, 3 Drawing Sheets

UNDERGROUND MINING RIB SUPPORT SYSTEM AND METHOD

CROSS REFERENCE TO PRIOR APPLICATIONS

This application claims priority and the benefit thereof from a U.S. Provisional Application No. 61/506,268 filed on Jul. 11, 2011 and entitled UNDERGROUND MINING RIB SUPPORT SYSTEM AND METHOD, the entire contents of which are herein incorporated by reference in their entirety.

FIELD OF THE DISCLOSURE

The present disclosure relates to a rib support system, a rib support device, and a method that may be used in underground mining or tunneling for strata and geological support of a mine or tunnel rib (or wall).

BACKGROUND OF THE DISCLOSURE

Mine (or tunnel) openings, created during room and pillar mining or longwall mining for example, are frequently supported using concrete structures, metallic structures, and/or fasteners, such as, e.g., bolts. It is also known to use, e.g., mobile roof supports (MRS), which may be hydraulically operated. Longwall mining techniques are also known that include using roof chocks and roof shields. These techniques may include using self-advancing hydraulic devices to hold the roof in the immediate area of a longwall mining machine, away from the machine and its operator.

At deeper strata of mining (or tunneling) operations, the strength and durability of the mine rib, roof, and rib support system are critical as pressure tends to increase with mine depth, frequently resulting in greater numbers of rib bumps, rib buckling, and other failures in supporting ribs. The increased forces on rib lines can result in spalling of support ribs, and ultimately, in wall failure and/or roof collapse. According to some studies, roof and rib control faults and failures account for more fatalities than any other single source during mining or tunneling operations.

Thin gauge steel straps are known in mining and tunneling industries. U.S. Pat. No. 4,091,628 to Jay Kelley discloses an arched roof support for a mine opening that essentially includes an elastic plate member with a preselected curvature across its length. The elastic plate member is employed for establishing a prestressed emplacement into a load-bearing contact along the middle portion of the roof stratum of the mine opening. The sides of the plate member are supported by ribs or additional support by roof bolts, rib bolts, or props. However, roof and rib supports made of metals, such as carbon steel, alloy steel, aluminum alloy, titanium alloy metal, and magnesium alloy metal, are susceptible to corrosion when used in wet areas, and the sharp metal edges can create sparks when coming into contact with rock walls, which may be dangerous in the presence of combustible gases, such as, e.g., methane.

An unfulfilled need exists for a rib support device, system and method that improve overall performance and strength of a mining or tunneling support system, while being corrosive resistant for longevity. The instant disclosure provides a rib support system, a rib support device, and a method that improve overall performance and strength in supporting mine (or tunnel) ribs to prevent spalling of the ribs and to provide safety and long term protection of tunnel (or open) areas, while providing corrosive resistance for longevity.

SUMMARY OF THE DISCLOSURE

According to one non-limiting example of the disclosure, a rib support system, a rib support device, and a rib support method are provided for supporting a rib (or wall) to prevent spalling of the rib, and to provide safety and long term protection of tunnel (or open) areas. Further, a method for manufacturing a rib support device is also provided herein. The rib support device may be made from a high density polyethylene (HDPE) material, or the like, that is resistant to corrosion, has superior overall performance and strength, has few (or no) sharp edges, is light weight, and is easy to handle.

The rib support system comprises a rib support device and at least one fastener. The rib support device may include an HDPE support strap that may be fastened to a rib (or wall) by means of the at least one fastener. The fastener may include, for example, a bolt, a nut, a clip, a clamp, a pin, a rod, or the like. The rib support system may further comprise at least one plate that may be provided between the at least one fastener and the device.

The rib support device comprises a substantially longitudinal HDPE strap that comprises one or more slots along its length and a cross-sectional angle of curvature. The one or more slots may be configured to receive, for example, a fastener, a gas input/output line, a vacuum line, an electrical supply line, a fluid (e.g., water) supply line, and the like.

The rib support method comprises: providing an HDPE rib support device; positioning the rib support device in a predetermined location on a rib (or wall, or roof); and affixing the rib support device to the rib by means of one or more fasteners.

According to a further aspect of the disclosure, a method for manufacturing the rib support device is provided. The method for manufacturing the rib support device comprises: providing a mold for the rib support device; pouring or injecting a high density polyethylene composition into the mold; and removing a formed high density polyethylene rib support device from the mold. The method for manufacturing the rib support device may further comprise drying the rib support device before, during, or after removal from the mold. The method for manufacturing the rib support device may also further comprise inspecting the resultant high density polyethylene rib support device for faults or defects and either approving the rib support device for a particular application or rejecting the rib support device for the a particular application. The particular application may comprise, e.g., for use to support a mine rib (or wall) at a predetermined depth and location.

Additional features, advantages, and embodiments of the disclosure may be set forth or apparent from consideration of the detailed description and drawings. Moreover, it is to be understood that the foregoing summary of the disclosure and the following detailed description and drawings are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

Figure 1:
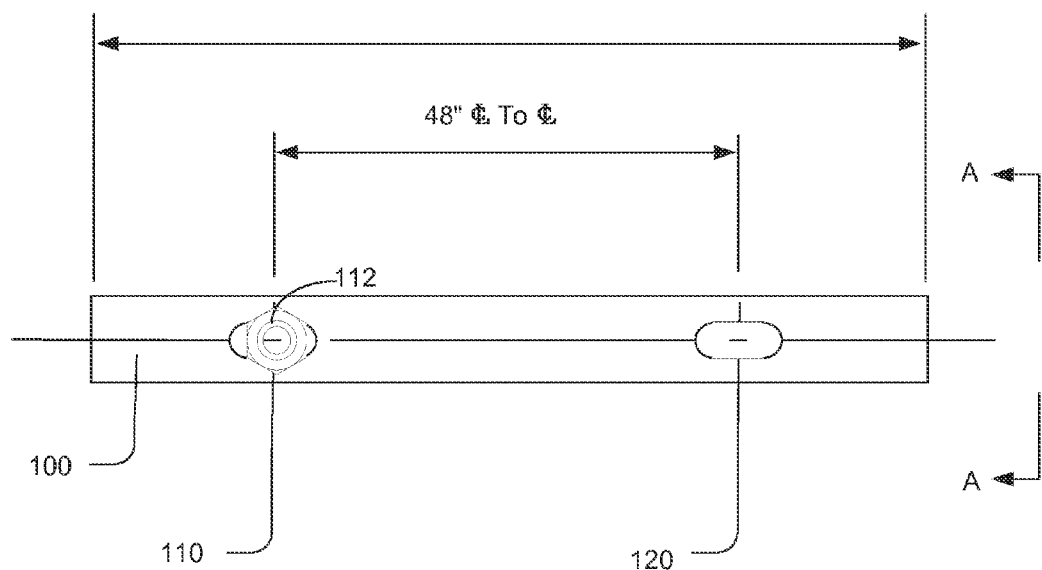
FIG. 1 shows an example of a rib support device that is constructed according to the principles of the disclosure.

The present disclosure is further described in the detailed description that follows.

DETAILED DESCRIPTION OF THE DISCLOSURE

The disclosure and the various features and advantageous details thereof are explained more fully with reference to the non-limiting embodiment and example that is described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The example used herein is intended merely to facilitate an understanding of ways in which the disclosure may be practiced and to further enable those of skill in the art to practice the embodiments of the disclosure. Accordingly, the example and embodiment herein should not be construed as limiting the scope of the disclosure. Moreover, it is noted that like reference numerals represent similar parts throughout the several views of the drawings.

A "computer", as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, or the like, or an array of processors, microprocessors, central processing units, general purpose computers, super computers, personal computers, laptop computers, palmtop computers, notebook computers, desktop computers, workstation computers, servers, or the like.

A "computer-readable medium", as used in this disclosure, means any medium that participates in providing data (for example, instructions) which may be read by a computer. Such a medium may take many forms, including non-volatile media, volatile media, and transmission media. Non-volatile media may include, for example, optical or magnetic disks and other persistent memory. Volatile media may include dynamic random access memory (DRAM). Transmission media may include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a computer. For example, sequences of instruction (i) may be delivered from a RAM to a processor, (ii) may be carried over a wireless transmission medium, and/or (iii) may be formatted according to numerous formats, standards or protocols, including, for example, WiFi, WiMAX, IEEE 802.11, DECT, 0G, 1G, 2G, 3G or 4G cellular standards, Bluetooth, or the like.

The terms "including", "comprising" and variations thereof, as used in this disclosure, mean "including, but not limited to", unless expressly specified otherwise.

The terms "a", "an", and "the", as used in this disclosure, means "one or more", unless expressly specified otherwise.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

FIG. 1 shows an example of a rib support device 100 that is constructed according to one embodiment of the disclosure. The rib support device 100 comprises a substantially longitudinal strap that may include one or more slots 110, 120 along its length and a cross-sectional angle of curvature. The diameter and thickness of the rib support device may be varied as required to maximize its effectiveness for a particular application. The slots 110, 120 may be positioned at any interval, including, e.g., at 48 inches from each other, as seen in FIG. 1. There may be multiple slots positioned at specific intervals apart on a rib support device. The slots 110, 120 may be configured to receive at least one fastener, gas input/output line, vacuum line, electrical supply line, fluid (e.g., water) supply line, and/or the like. For example, a fastener 112 is shown in slot 110. Fasteners may include, for example, a bolt (such as, e.g., a rock bolt), a nut, a clip, a clamp, a pin, a rod, or the like. The rib support device 100 may be configured to be used with at least one plate that may be provided between the at least one fastener and the rib support device 100.

Figure 2:
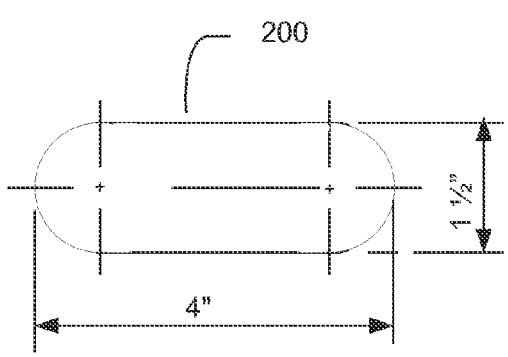
FIG. 2 shows an example of a slot in the rib support device of FIG. 1.
Figure 3:
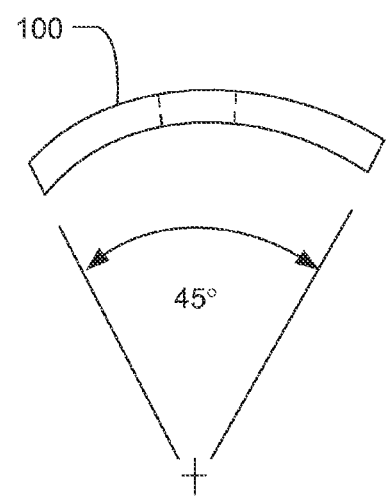
FIG. 3 shows a cross-section view of the rib support device of FIG. 1.

FIG. 2 shows an example of a slot 200 that may be provided in the rib support device 100. Slots 110 and 120 (shown in FIG. 1) may be implemented according to the structure of slot 200. The slot 200 may have an oval shape, as shown. Alternatively, the slot 200 may have, e.g., but is not limited to, a circular shape, a square shape, a rectangular shape, a triangular shape, or any other shape suitable for a particular application, as those having ordinary skill in the art will recognize. Different slots 200 on a single rib support device 100 may have different shapes and/or sizes from each other. The slot 200 may include a longitudinal length of, e.g., 4 inches and a width of, e.g., 1.5 inches. The slot 200 is contemplated to have other values for the longitudinal length and width, other than 4 inches and 1.5 inches, respectively, FIG. 3 shows a cross-section view of the rib support device 100 curt along the lines A-A and from the perspective of the arrows associated with the cross-section line A-A shown in FIG. 1. The rib support device 100 is configured to have a radius of curvature along the length of the rib support device 100. The radius of curvature may comprise, e.g., about 45 degrees. However, other radii of curvature are contemplated, including angles that are substantially greater than 45 degrees and angles that are substantially smaller than 45 degrees.

A rib support system (not shown) may be configured by providing the rib support device 100 and one or more fasteners (not shown). The rib support system may further comprise a plate (e.g., a face plate, not shown) that may be positioned between a fastener end and a surface of the rib support device 100. The rib support device 100 may be fastened (e.g., bolted) to a mine (or tunnel) wall to prevent spalling of the wall (e.g., rock) for safety and long term protection of open areas. The fastener(s) may include, for example, a bolt, a nut, a clip, a clamp, a pin, a rod, or the like.

The rib support device 100 is preferably, entirely constructed of high density polyethylene. The fastener(s) (not shown) and/or plate (not shown) may be constructed as is known by those having ordinary skill in the art.

Figure 4:
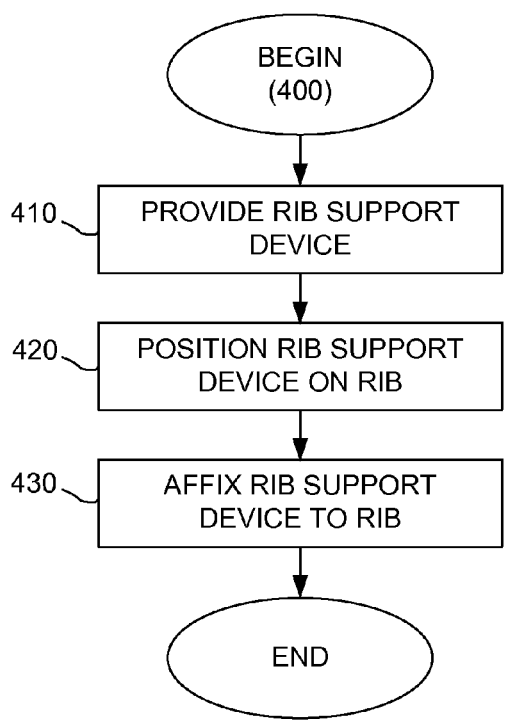
FIG. 4 shows an example of a process for supporting a rib, wall, or roof according to principles of the disclosure.

FIG. 4 shows an example of a process (or method) 400 for supporting a rib, wall, or roof in a mine or tunnel, according to one embodiment of the disclosure. The process 400 may begin by providing a rib support device 100 to a particular location in a mine or tunnel (Step 410). The provided rib support device 100 may then be positioning in a predetermined location on a rib (Step 420) and affixing to rib by means of one or more fasteners (Step 430). The process 400 may be repeated as necessary.

It is noted that the process 400 shown in FIG. 4 may be automated and controlled by a computer. In this regard, a computer readable medium may be provided that contains a computer program, which when executed on the computer causes the process 400 in FIG. 4 to be carried out. The computer program may be tangibly embodied in the computer readable medium, comprising a code segment or code section for each of the steps 410 through 430.

Figure 5:
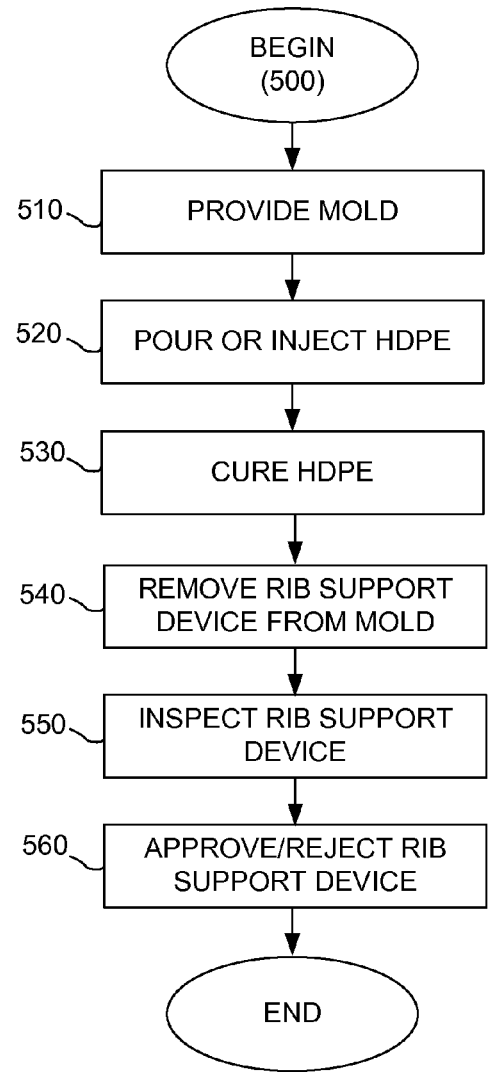
FIG. 5 shows an example of a process for manufacturing a rib support device according to the principles of the disclosure.

FIG. 5 shows an example of a process (or method) 500 for manufacturing the rib support device 100, according to one embodiment of the disclosure. The process 500 may begin by providing a mold for the rib support device 100 to a particular location in, e.g., a manufacturing facility (Step 510). A high density polyethylene material (HDPE), or another material that has the characteristics of HDPE, may be poured or injected into the mold (Step 520) and cured for a predetermined period of time (Step 530). The rib support device 100 may then be removed from the mold (Step 540). The process 500 may further comprise inspecting the resultant rib support device for faults or defects (Step 550) and either approving the rib support device for a particular application or rejecting the rib support device for the particular application (Step 560). The particular application may comprise, e.g., for use to support a mine rib, wall, or roof at a predetermined depth and location.

It is noted that the process 500 shown in FIG. 5 may be automated and controlled by a computer. In this regard, a computer readable medium may be provided that contains a computer program, which when executed on the computer causes the process 500 in FIG. 5 to be carried out. The computer program may be tangibly embodied in the computer readable medium, comprising a code segment or code section for each of the steps 510 through 560.

According to another embodiment of the disclosure, the rib support device 100 may be made by segmentally cutting, e.g., an HDPE pipe, into a plurality of sections. For example, the rib support device 100 may be made by cutting a 6 inch HDPE pipe into four sections, each of which may be implemented as the rib support device 100.

According to a further embodiment of the disclosure, the rib support device 100 may be manufactured through a die extrusion process. For example, a die (not shown) may be configured to receive a resin and to form the resin into the rib support device 100. The die extrusion process may be continuous, semi-continuous, or periodic, to output a continuous material that may be cut into a plurality of rib support devices 100, to output a plurality of rib support devices 100, or to output individual rib support devices 100, one-at-a-time.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications or modifications of the disclosure. For example, the rib support device 100 may be made from materials other than HDPE, including, e.g., a fiberglass material, a carbon-fiber material, or any other material that has similar or superior characteristics to HDPE.

What is claimed:

1. A rib support system for supporting a rib to prevent spalling of the rib and to provide safety and long term protection of a mine, a tunnel or an open area, the system comprising:
    a rib support device that is made of a high density polyethylene (HDPE) material, the rib support device being provided in the form of a substantially, longitudinal strap comprising a cross-sectional angle of curvature throughout the length thereof; and
    a fastener that is configured to fasten the rib support device to the rib.

2. The rib support system of claim 1, wherein the longitudinal strap comprises:
    the length thereof.

3. The rib support system of claim 1, wherein the fastener comprises at least one of:
    a bolt;
    a nut;
    a clip;
    a clamp;
    a pin; and
    a rod.

4. The rib support system of claim 1, wherein the one or more slots comprise at least two slots that are positioned about 48 inches apart.

5. The rib support system of claim 2, wherein the one or more slots are configured to receive at least one of:
    a fastener;
    a gas input or output line;
    a vacuum line;
    an electrical supply line; and
    a water line.

6. The rib support system of claim 2, wherein the one or more slots on the rib support device comprise one or more of:
    a circular shape;
    a square shape;
    a rectangular shape;
    an elliptical shape;
    an oval shape; or
    a triangular shape.

7. The rib support system of claim 2, wherein the one or more slots comprise a longitudinal length of about 4 inches and a width of about 1.5 inches.

8. The rib support system of claim 1, wherein the angle of curvature comprises an angle of about 45 degrees.

9. The rib support system of claim 1, wherein the rib support device is attachable to a tunnel wall or a tunnel roof.

10. The rib support system of claim 1, wherein of the rib support device comprises:
   the substantially longitudinal strap includes two slots positioned along the length thereof,
   wherein the longitudinal strap comprises a cross-sectional angle of curvature, and
   wherein at least one of the two slots comprises an oval shape.

11. A method for supporting a rib in a mine, a tunnel, or an open area to prevent spalling of the rib and to provide safety and long term protection of the mine, the tunnel or the open area, the method comprising:
   providing a high density polyethylene rib support device that includes a predetermined length, a predetermined width, and a predetermined cross-sectional angle of curvature throughout the length thereof;
   positioning the rib support device in a location on a rib or a roof;
   providing a fastener that is configured to attach the rib support device to the rib or the roof; and
   affixing the rib support device to the rib or the roof by means of the fastener.

12. The method of claim 11, further comprising:
   providing another fastener that is configured to further secure the rib support device to the rib or the roof; and
   securing the rib support device to the rib or the roof by means of said another fastener.

13. A method of claim 11, wherein:
   the rib support device comprises a substantially longitudinal strap that includes one or more slots positioned along the length thereof; and
   the one or more slots are configured to receive a portion of the fastener.

\* \* \* \* \*